(12) United States Patent
Flickenger

(10) Patent No.: US 6,360,930 B1
(45) Date of Patent: Mar. 26, 2002

(54) VEHICLE RACK ASSEMBLY WITH HYDRAULIC ASSIST

(75) Inventor: Mick Flickenger, Canal Fulton, OH (US)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 09/546,353

(22) Filed: Apr. 10, 2000

(51) Int. Cl.[7] .............................................. B60R 9/042
(52) U.S. Cl. ...................... 224/310; 224/502; 118/314
(58) Field of Search ................................ 224/309, 310, 224/502–509; 16/84; 118/314, 315

(56) References Cited

U.S. PATENT DOCUMENTS

| | | | |
|---|---|---|---|
| 3,963,136 A | | 6/1976 | Spanke |
| 3,979,790 A | * | 9/1976 | Chiarappa ....................... 16/84 |
| 4,717,054 A | * | 1/1988 | Vanzant ................... 224/504 X |
| 4,877,108 A | | 10/1989 | Griffin et al. |
| 5,052,712 A | * | 10/1991 | Raidel |
| 5,058,791 A | | 10/1991 | Henriquez et al. |
| 5,297,912 A | | 3/1994 | Levi |
| 5,398,778 A | | 3/1995 | Sexton |
| 5,529,231 A | * | 6/1996 | Burgess ....................... 224/502 |
| 5,588,510 A | * | 12/1996 | Wilke |
| 5,632,591 A | | 5/1997 | Henriquez |
| 5,730,345 A | * | 3/1998 | Yeckley ....................... 224/505 |
| 5,850,891 A | | 12/1998 | Olms et al. |

* cited by examiner

Primary Examiner—Gregory M. Vidovich
(74) Attorney, Agent, or Firm—Hahn Loeser + Parks LLP

(57) ABSTRACT

A utility rack for a motor vehicle is provided comprising a stationary mounting frame mountable to a vehicle, a cargo frame movable between an access position and a storage position and capable of carrying substantially elongated cargo, a carriage to move said cargo frame between said access position and said storage position, said carriage movably attaching said cargo frame to said mounting frame, said carriage being manually actuated to move said cargo frame between said access position and said storage position, said carriage comprising an assist capable of assisting manual movement of said cargo frame between said storage position and said access position.

24 Claims, 5 Drawing Sheets

VEHICLE RACK ASSEMBLY WITH HYDRAULIC ASSIST

TECHNICAL FIELD

The present invention is directed to a vehicle rack assembly for the storage and transportation of items on a motor vehicle. More particularly, the present invention is directed to a utility rack assembly for the storage and transportation of substantially elongated items such as ladders on a motor vehicle. More particularly, the present invention is directed to a vehicle rack assembly with a hydraulic assist, which facilitates the manual deployment of the utility rack from a storage to an access position.

BACKGROUND OF THE INVENTION

Utility racks are used on motor vehicles to transport a wide variety of cargo. In particular, vehicle racks used with utility vehicles such as vans and pickup trucks are used to transport a variety of tools and implements such as ladders, pipes, building materials, rakes, shovels, brooms and sporting equipment such as skis, surfboards, ski poles, bicycles, and other items. In general, such large elongated bulky items are difficult to place on the top of a vehicle in a storage position for transport. In order to facilitate movement of such items from the ground up to a storage position on the vehicle, a variety of storage racks have been designed. In the case of the storage and transportation of ladders, utility racks have been designed to provide an access position for cargo loading and unloading wherein cargo such as a ladder is placed on the rack in a position substantially alongside a utility vehicle followed by a manual actuation of a mechanism to move the ladder from the access position up into a storage and transportation position substantially above the utility vehicle.

Movement of a stored ladder between the access position and the storage position requires a significant amount of effort on the part of the user. Movement of the ladder from the access position to the storage position involves user effort against the force of gravity to move the ladder in a generally upward direction. However, when moving the ladder from the storage position to the access position, a user must be careful to prevent the ladder from suddenly slamming down under the influence of gravity. Movement in this downward direction not only requires the user to use care and considerable effort in easing the ladder down to the access position, but is potentially dangerous if a ladder stored on the rack were to fall rapidly into the access position, potentially causing injury to persons standing under or near the rack, or damage to the vehicle.

In order to decrease the amount of effort required by a user of the ladder rack and to reduce the potential for injury to users, there exists a need for a manually actuated utility rack with an assist to slow the speed of deployment of a utility rack from a storage position to an access position that requires a minimum of effort by a user.

SUMMARY OF THE INVENTION

It is therefore an object of the present invention to provide a utility rack having an assist to enable movement of ladders and elongated cargo from a storage position to an access position.

It is another object of the present invention to provide a utility rack with an assist to slow the speed at which the utility rack is deployed from a storage to an access position.

It is yet another object of the present invention to provide a utility rack with an assist that allows for substantially hands free delivery of a ladder or other elongated cargo into the access position.

These and other objects will become apparent to one of ordinary skill in the art as described in the following specification, drawings, and claims.

The present invention provides a utility rack for a motor vehicle comprising a stationary mounting frame mountable to a vehicle, a cargo frame movable between an access position and a storage position and capable of carrying substantially elongated cargo, and a carriage to move the cargo frame between the access position and the storage position. The carriage movably attaches the cargo frame to the mounting frame, with selective actuation by the user to move said cargo frame between the access position and the storage position. The carriage further comprises an assist capable of facilitating movement of the cargo frame between the storage position and the access position.

DETAILED DESCRIPTION OF THE INVENTION

The preferred embodiment of the present invention comprises a manually actuated utility rack for a motor vehicle as generally shown in U.S. Pat. No. 5,058,791, the teachings of which are fully incorporated by reference herein.

Several versions of utility racks are known, each of which generally comprises a mounting frame mountable to the roof or otherwise above a utility vehicle, a cargo frame capable of carrying substantially elongated cargo and moveably attached to the mounting frame through a carriage which causes the cargo frame to move between a cargo access position to a cargo storage position or vice versa. In the cargo frame access position, cargo is loaded or unloaded by a user, and in the cargo frame storage position, cargo is secured for transport by the utility vehicle. Some versions of these utility racks include in the carriage a motorized mechanism for moving the cargo between the storage and access positions. Other versions, such as that disclosed in U.S. Pat. No. 5,058,791, teach a manually actuated carriage that operates completely through manual effort by a user. The present invention comprises a utility rack having a mounting frame mountable to a vehicle, a cargo frame moveably attached to the mounting frame, by a carriage which facilitates movement of the cargo frame between a cargo access position and a cargo storage position, wherein the apparatus includes an assist capable of facilitating manual movement of the cargo frame between the access position and storage positions.

Figure 1:
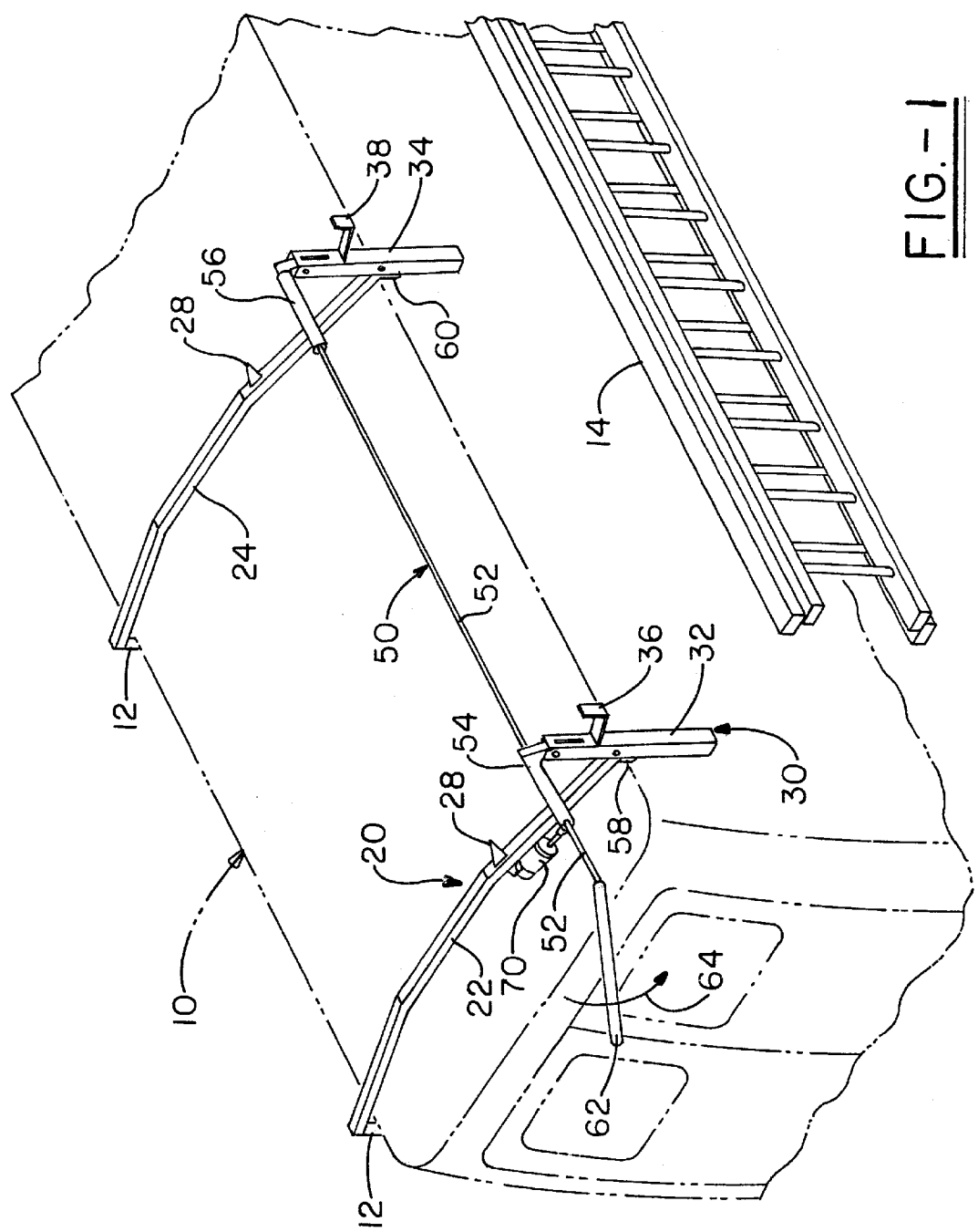
FIG. 1 is a perspective view of the utility rack and assist of the present invention mounted to the roof of a utility vehicle.

One embodiment of the present invention is as shown in FIG. 1. The utility rack as generally similar to the Slide-Down Ladder Rack from The Crown Division of Wooster, Ohio. Referring now to FIG. 1, the utility rack generally comprises a mounting frame 20 mounted to the roof of or otherwise attached above a utility vehicle 10 in any suitable manner. The frame 20 may extend partially or fully across the width of the vehicle. Mounting frame 20 in the preferred embodiment comprises at least two substantially parallel frame members 22, 24 each of which spans the motor vehicle and is mounted thereon. Additional frame members can be used depending upon the weight and size of the cargo to be stored and transported. Additional frame members providing further support and stability to the utility rack and cargo stored thereon are fully encompassed by this invention. Frame members 22 and 24 are mounted to the roof of a utility van as shown in FIG. 1 via mounts 12. In an alternative embodiment, frame members 22 and 24 can be mounted via a separate mounting assembly above the bed and/or cab of a pickup truck.

Again referring to FIG. 1, the utility rack of the preferred embodiment includes a movable cargo frame 30 capable of accommodating a ladder or other substantially elongated cargo. Cargo frame 30 may include a pair of substantially parallel cargo members 32, 34. Each of the cargo members 32 and 34 comprise a cargo-securing member 36, 38 to secure cargo such as a ladder 14 or other substantially elongated cargo. Cargo frame 30 is movably attached to mounting frame 20 via carriage 50. Again, the cargo frame 30 could be made up of other frame members if desired.

Carriage 50 is manually or motor actuated to move cargo frame 30 between an access position substantially alongside vehicle 10 to a storage position substantially above vehicle 10. As shown in FIG. 1, in one embodiment, carriage 50 comprises rotatable bar 52, which is rotatably connected to frame members 22 and 24. Rotatable bar 52 may extend beyond frame member 22 and beyond the rear of vehicle 10 to provide for attachment of a handle 62 to one end of bar 52. Carriage 50 also preferably includes carriage members 54 and 56. Carriage members 54 and 56 are generally L-shaped members each of which is attached to rotatable bar 52. In the embodiment shown in FIG. 1, carriage members 54 and 56 are attached to rotatable bar 52 in the vicinities of the rotatable attachment of bar 52 to frame members 22 and 24. First ends of carriage members 54 and 56 are attached to rotatable bar 52, and may be generally L-shaped, although any suitable shape is contemplated. Each of the first ends of carriage members 54 and 56 are pivotably attached to cargo members 32 and 34. Carriage 50 further includes a second pair of carriage members 58 and 60. In the embodiment illustrated in FIG. 1, carriage members 58 and 60 interact with cargo members 32 and 34 to facilitate movement between the access and storage positions. In the preferred embodiment, the carriage members 58 and 60 comprise a pair of rollers which pivotably and slideably engage cargo members 32 and 34 as disclosed in U.S. Pat. No. 5,058,791, which is fully incorporated herein by reference. In a preferred embodiment, carriage members 58 and 60 allow cargo members 32 and 34 to each slide along and pivot about frame members 22 and 24 at the attachment defined by carriage members 58 and 60.

Figure 2:
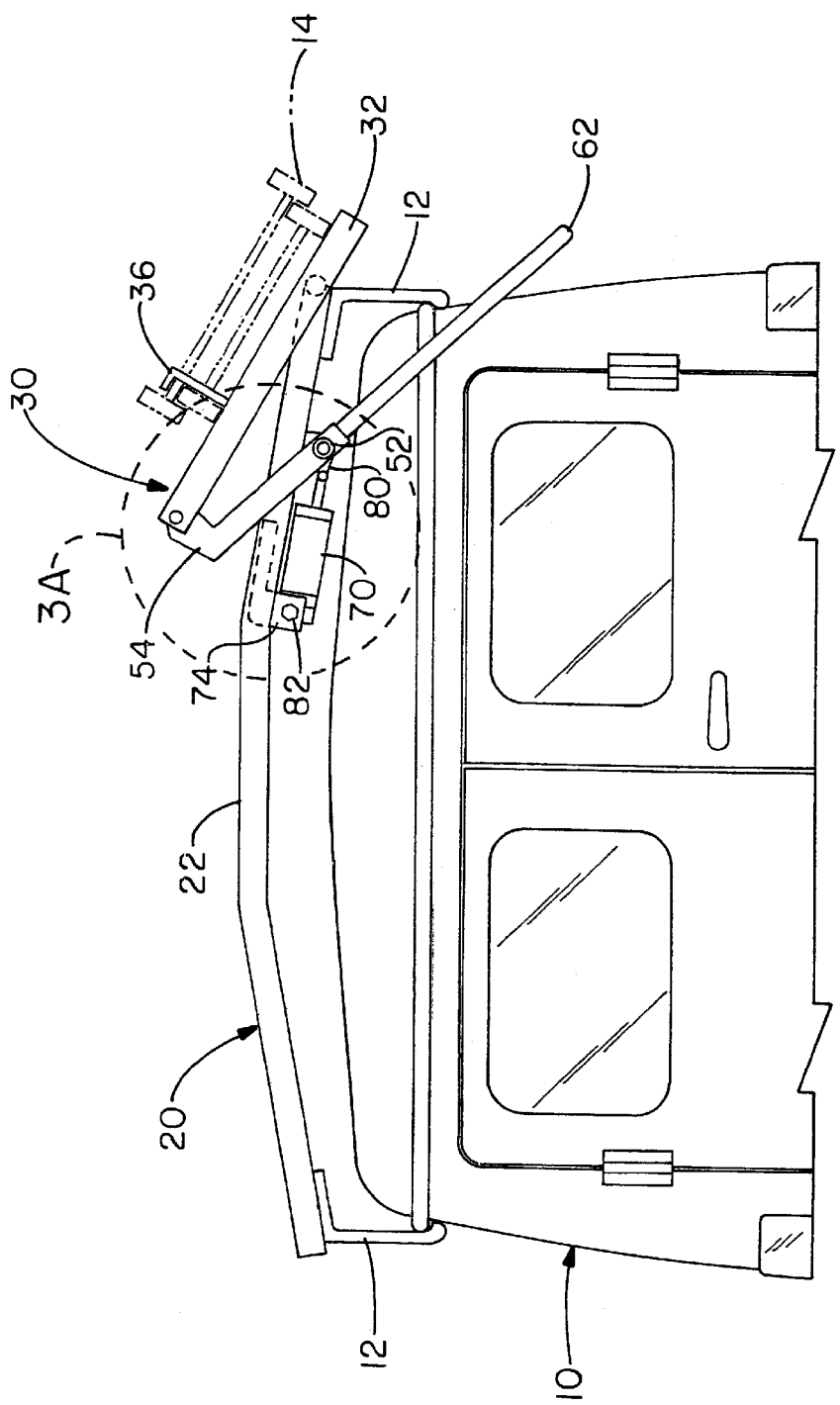
FIG. 2 is a rear view of the utility rack and assist of the present invention mounted to the roof of a utility vehicle.
Figure 3A:
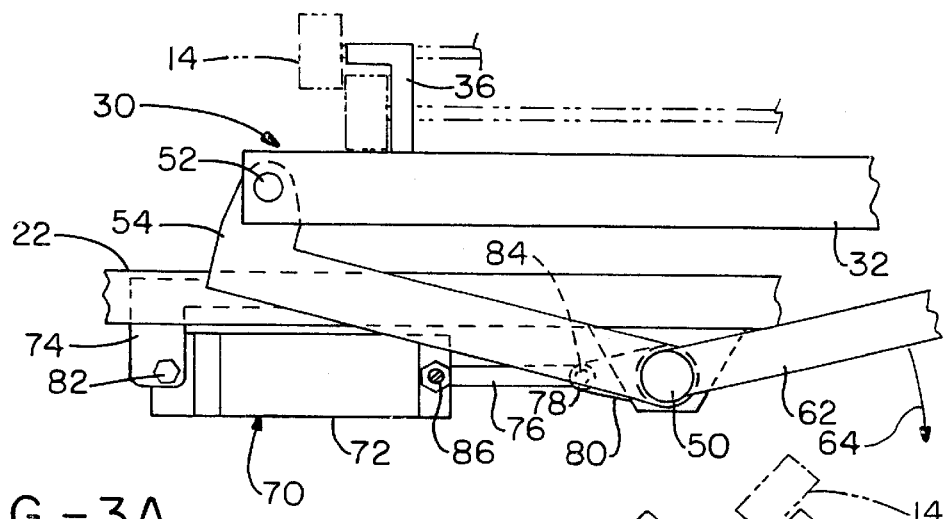
FIG. 3a is an expanded view of the encircled portion of FIG. 2 showing the assist in the storage position.
Figure 3B:
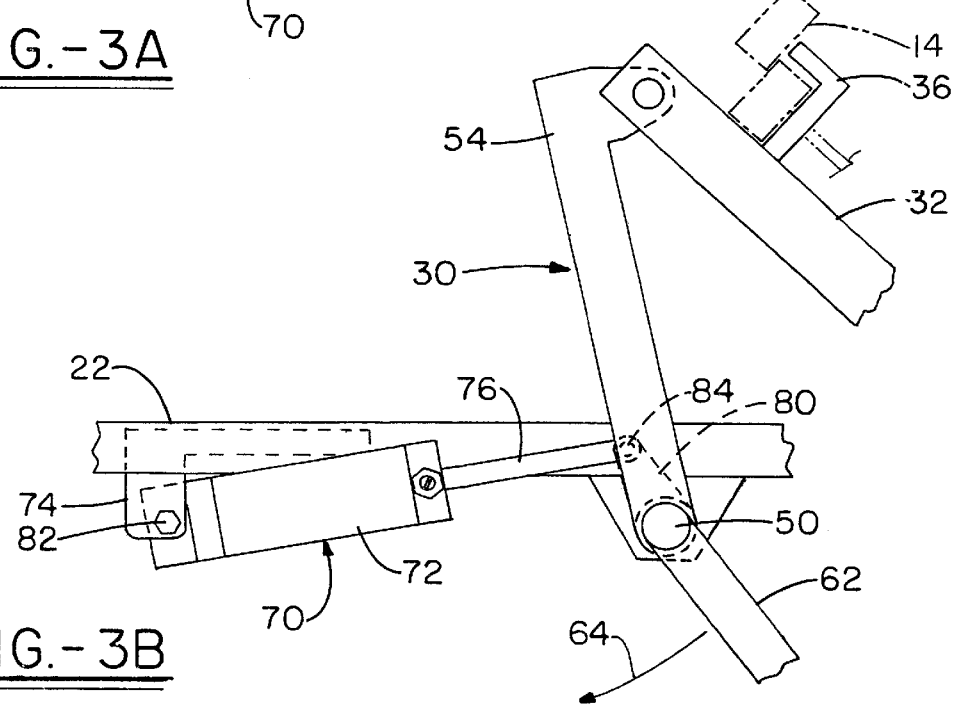
FIG. 3b shows the encircled view of FIG. 2 with the assist in the partially deployed position.
Figure 3C:
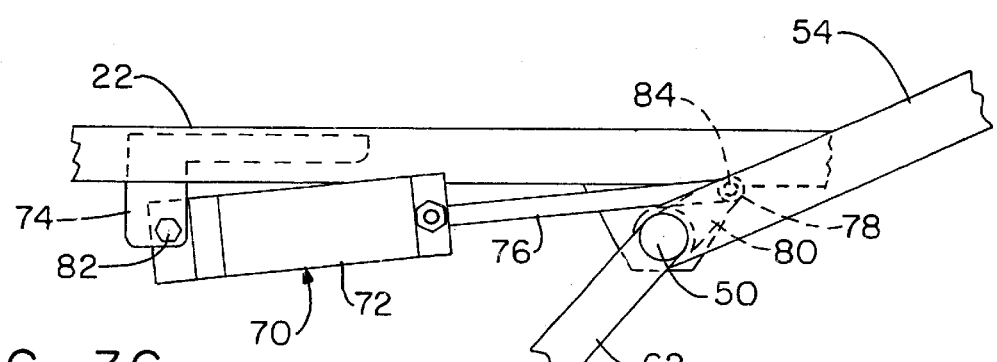
FIG. 3c shows the assist of the present invention in the fully deployed position.

Again referring to FIG. 1, the utility rack of the present invention includes assist 70. Assist 70 is shown from the rear of the utility vehicle 10 in FIG. 2. In the embodiment shown in FIG. 2, assist 70 is attached to frame member 22 via bracket 74 and to rotatable bar 52 via bracket 80. In a preferred embodiment, assist 70 is a single rod hydraulic cylinder having an outwardly extending piston rod engaging bracket 80. Detail of the encircled portion of FIG. 2 is shown in FIGS. 3a, 3b and 3c. Referring now to FIG. 3a, assist 70 is shown with ladder 14 stowed on cargo member 32 in the storage position. In this embodiment, assist 70 includes assist body 72 pivotably attached to bracket 74 via bolt 82 or other suitable attachment. Bracket 74 is attached to the frame member 22, which in the preferred embodiment is fabricated from C-channel stock. The bracket 74 may be mounted to the interior channel of frame member 22. Assist 70 includes outwardly extending piston rod 76, which in turn is attached to rotatable bar 52 via bar bracket 80. Bar bracket 80 is attached to and rotates with rotatable bar 52 upon actuation of carriage 50. Rod 76 is rotatably attached to bar bracket 80 via rod bracket 78 and bolt 84.

Operation of the present invention is illustrated by reference to the embodiment illustrated in FIGS. 3a, 3b and 3c. In FIG. 3a, ladder 14 is shown in the storage position of cargo frame 30. To deploy the ladder from the storage position as shown in FIG. 3a to the access position substantially alongside the utility vehicle, actuation may be manually performed by the user using handle 62, to exert manual force in a clockwise direction as depicted by arrow 64. Application of this manual force induces rotation of rotateable bar 52 and carriage members 54 and 56. Rotation of rotatable bar 50 also induces rotation of bar bracket 80, which induces a simultaneous rotation of assist 70 about bolt. 84 and extension of piston rod 76. Alternatively, actuation could be performed by a motorized mechanism causing rotation of bar 52.

Figure 4A:
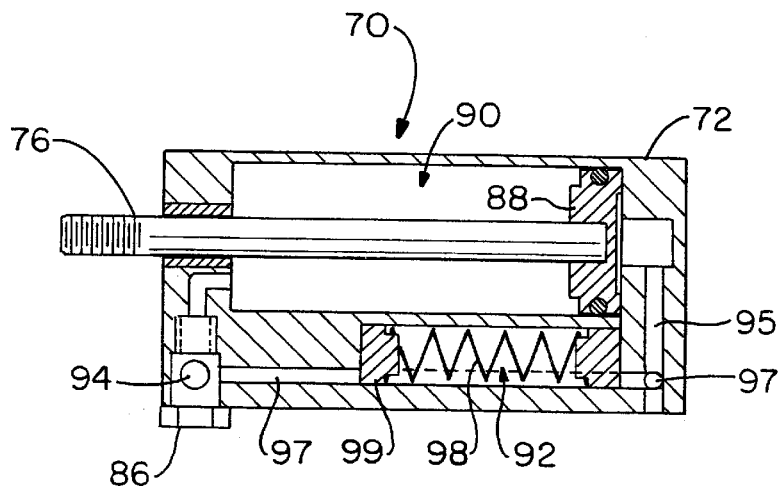
FIG. 4a shows a cross-sectional view of a hydraulic assist with an internal hydraulic liquid compensation circuit.
Figure 4B:
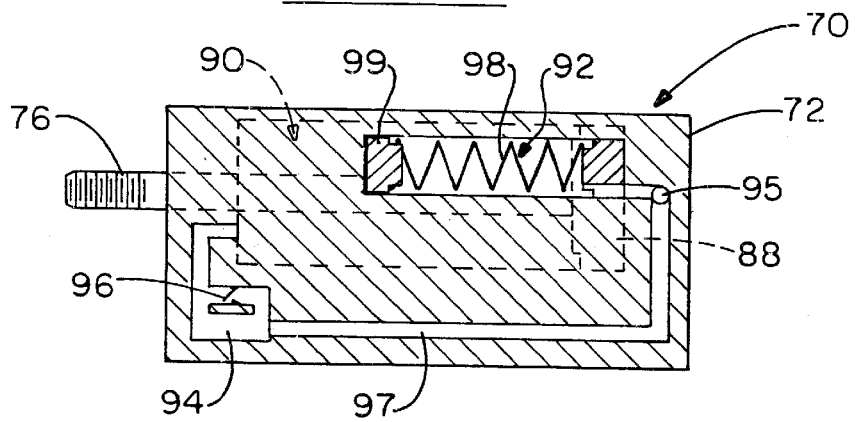
FIG. 4b illustrates a partial cross-sectional view from the top, showing a portion of the hydraulic circuit of the preferred embodiment.

An internal hydraulic circuit of assist 70 as shown in FIG. 4a resists the extension of piston rod 76 upon rotation of rotatable bar 52. With reference now to FIG. 4a, the embodiment shows assist 70 as a hydraulic assist with a single rod piston. Piston head 88 is located in cylinder chamber 90 that is cross connected to allow venting of hydraulic fluid between the rod side and blind side of piston head 88. When piston rod 76 is extended, hydraulic fluid from the rod end of the cylinder chamber 90 passes through adjustable speed control orifice 94 to provide a predetermined amount of resistance to fluid flow through the orifice 94, to thereby provide resistance or damping to extension of piston rod 76. The adjustable speed control allows selective damping of movement of cargo frame and cargo thereon, and can be adjusted to accommodate different weight cargo or for other purposes. Fluid passing through adjustable orifice 94 during extension of piston rod 76 flows through conduit 97, and through to the blind side of piston 88 in cylinder chamber 90. Since the volumetric fluid requirement of the blind end side is greater than that of the rod end side, piston reservoir 92 provides makeup fluid for the blind end side of cylinder 90. As piston head 88 is moved to the extended position, the fluid pressure drops on the blind end side of piston 88 because of the insufficient fluid volume to fill the blind end side of cylinder chamber 90, and spring 98 and atmospheric pressure force the equivalent of the required volume of fluid from piston make up reservoir 92 into the blind end side of cylinder chamber 90. Free movement of fluid from the rod end side of cylinder 90 to the blind end side of cylinder 90 is prevented by check valve 96. Check valve 96, as shown in FIG. 4b, thereby diverts fluid from the rod end side of piston 88 through adjustable orifice 94 to provide load resistance during the extension stroke of rod 76. In the reverse operation, as piston rod 76 is retracted from its extended position, fluid flow from the blind end side of cylinder 90 freely flows through conduit 97 and through check valve 96 to the rod end side of cylinder 90 as piston 88 moves to the fully retracted position. The volumetric differential of fluid from the blind end side of cylinder 90 is forced against piston 99 in volume compensation reservoir 92 and thereby extends spring 98. Volume compensation reservoir 92 is vented to the atmosphere to compensate for back pressure effects.

Figure 4C:
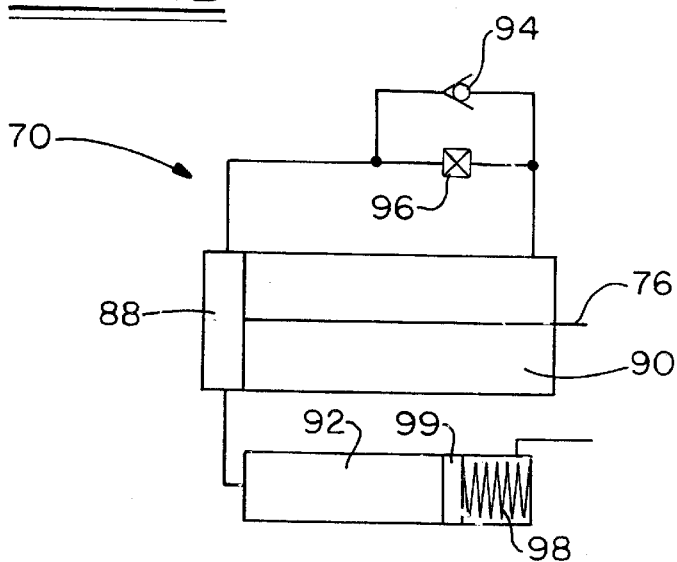
FIG. 4c illustrates schematically the hydraulic circuit of FIGS. 4a and 4b.

Again referring to FIG. 3a, as the system is actuated by the user applying manual force to handle 62 in a clockwise direction as indicated by arrow 64, or is motor actuated, the bar 52 is rotated causing corresponding movement of carriage 50. This movement in turn causes piston rod 76 to begin to move from its fully retracted position when ladder 14 and cargo frame 30 are in the stored position. Piston rod 76 extends against resistance provided by the internal hydraulic circuit of assist 70 as shown in FIGS. 4a, b and c. The user or motor must supply sufficient force to overcome the resistive force provided by the hydraulic circuit and the weight of the ladder and cargo frame. As bar 52 and carriage members 54 and 56 move, the cargo frame initiates movement to the access position until, the weight of ladder 14 and cargo frame 30 continues extension of piston rod 76 to the fully extended position. The resistance to extension of piston rod 76 provided by the internal hydraulic circuit of assist 70 as shown in FIGS. 4a, 4b and 4c slows the rate at which cargo frame 30 and ladder 14 move from the substantially horizontal position of carriage members 54 and 56 as shown in FIG. 3b to the fully deployed position of ladder 14 and cargo frame 30 in an access position substantially alongside the utility vehicle, with handle 62 carriage member 54 and piston rod 76 in their fully deployed positions as shown in FIG. 3c. During the deployment of cargo frame 30 and ladder 14, assist 70 is able to pivot about bolt 82 and bracket 74. The C-channel construction of frame member 22 allows body 72 of assist 70 to move in an upward direction to a position within frame member 22 as shown in FIGS. 3b and 3c. Other possible constructions are contemplated to allow this motion.

In the reverse operation, movement of ladder 14 from the access position of cargo frame 30 substantially alongside vehicle 10 as shown in FIG. 1 to the storage position is effected by a user by application of manual force to handle 62 in a counterclockwise direction or reversal of a motor accordingly. During this motion, piston rod 76 is retracted from its fully extended position to its fully retracted position and no resistance is provided by assist 70 as fluid by the blind side of piston 88 is diverted from adjustable orifice 94 through check valve 96 to the rod side of piston 88.

Thus, in the preferred operation, assist 70 provides for assisted or dampened movement of cargo frame 30 from the storage position to the access position and allows for unrestricted manual movement of cargo frame 30 and ladder 14 from the access position to the storage position. During movement of cargo frame 30 and ladder 14 from the storage position, assist 70 provides speed control of the movement of cargo frame 30 and ladder 14 from the storage position to the access position sufficient to permit hands free movement of cargo frame 30 and ladder 14 under the influence of gravity.

Figure 5:
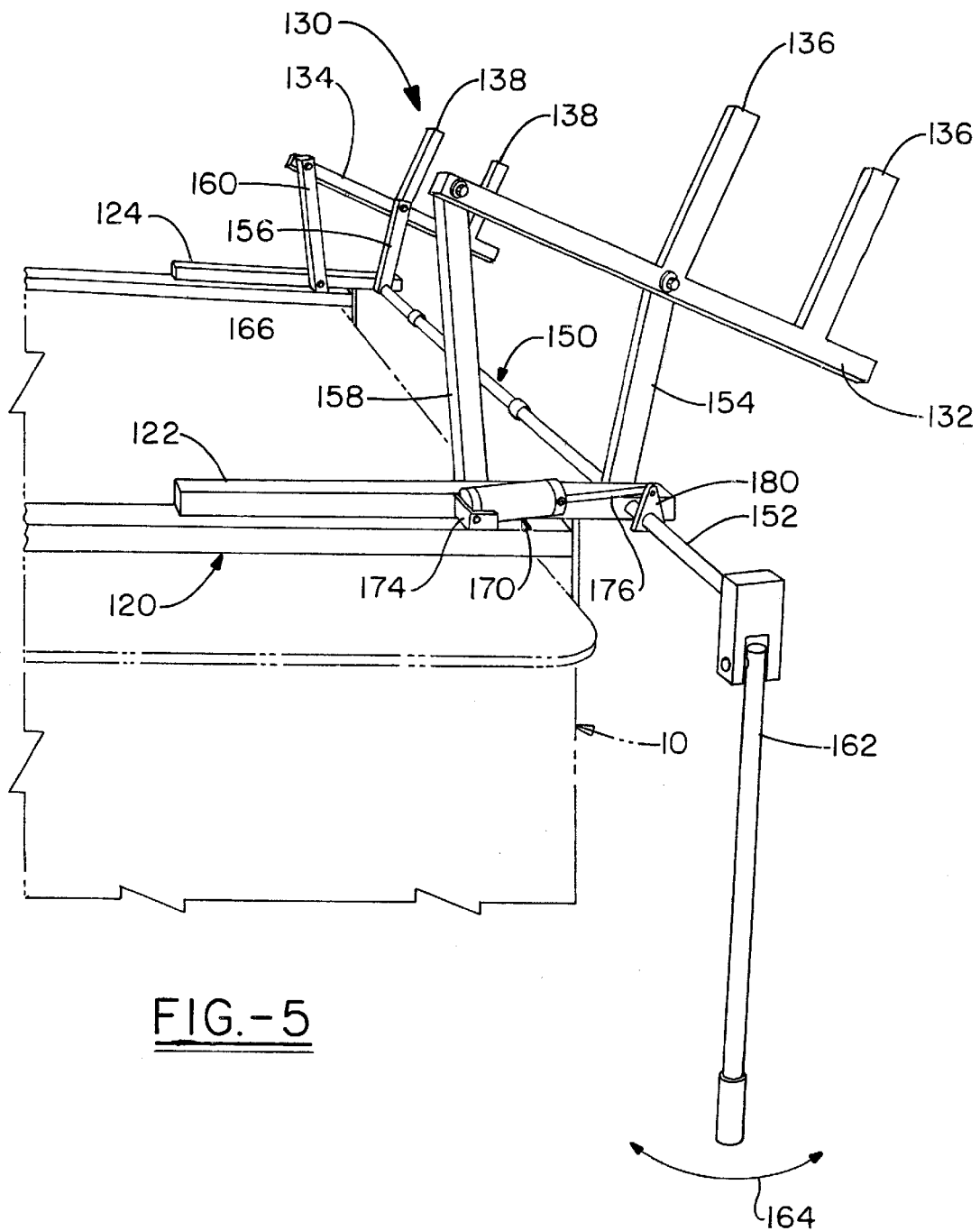
FIG. 5 shows an alternative embodiment of the utility rack and assist of the present invention.

Another embodiment of the present invention is shown in FIG. 5. In this embodiment, carriage 150 comprises rotatable bar 152 a first pair of carriage members 154 and 156, and a second pair of carriage members 158, 160. The second pair of carriage members 158 and 160 may be of similar length or preferably are longer than the first pair of carriage members 154 and 156, thus allowing movement of cargo frame 130 between access and storage positions relative to vehicle 10 during rotation of 25 rotatable bar 152. In the embodiment shown in FIG. 5, assist 170 is connected to rotatable bar 152 via bar bracket 180 and provides resistance to movement and speed control during deployment of cargo frame 130 from the storage position to the access position in a manner substantially similar to that described for the embodiment of FIGS. 3a, 3b and 3c. In all embodiments, it is not necessary that assist 70 or 170 be attached to the rotatable bar 52 or 152. In this embodiment for example, attachment of assist 170 can be effected between mounting frame 120 and any point on carriage 150 or cargo frame 130. One of ordinary skill in the art will appreciate that the positioning of assist 170 is best accomplished by considering the minimization of the size of the assist as well as a maximization of mechanical advantage provided by the assist. In another unshown embodiment, assist 170 is oriented such that bracket 174 attached to frame member 122 and bracket 180 is attached at a point on carriage member 158, preferably near bolt 166. A similar attachment could be effected between frame member 124 and carriage member 160.

As depicted in FIG. 5, cargo frame 130 can comprise multiple pairs of cargo securing members 136 and 138 depending upon the particular cargo to be transported and stored. While the utility rack assembly and assist of the present invention has been described herein through embodiments as a ladder rack, the invention is not so limited and can be envisioned to accommodate a wide variety of cargo. Cargo that can be accommodated by the present invention is generally cargo having a substantially elongated dimension that makes it suitable for storage on the top of a vehicle. Such cargo includes, but is not limited to, ladders, pipes, lumber, building materials, sporting equipment such as skis, ski poles, surfboards, snowboards, and bicycles, and tools such as rakes, shovels, and brooms. Thus, the particular design of the cargo frame and in particular the cargo-securing members may be generally specific to the cargo to be stored and transported. A wide variety of cargo frames and/or securing members are contemplated and are fully encompassed by this invention. Similarly, the construction of the carriage to move the cargo frame from storage to access positions can vary from the embodiments shown herein.

The utility rack and assist of the present invention have been described with reference to use with a utility vehicle such as a van or pickup truck, but the invention is not so limited. The utility rack and assist are readily adaptable to mounting on a wide variety of vehicles including vans, minivans, pickup trucks, sport utility vehicles, cars, and trailers.

A preferred embodiment of the assist used with the ladder rack has been described herein as a single rod hydraulic assist. The particular design of the assist is not so limited, and variations on the preferred embodiment of the assist are within the scope of this invention. It is desirable that the resistance provided by the assist to movement of the cargo frame and any cargo from the storage position to the access position be substantially greater than the resistance provided by the assist to movement of the cargo frame and any cargo from the access position to the storage position. By substantially greater resistance, it is meant that the resistance provided by the assist to movement of the cargo frame from the storage position to the access position be sufficient to prevent the cargo frame and any cargo from a sudden, hard fall to the access position during actuation of the carriage. The resistance to movement of the cargo frame from the storage position to the access position is thus sufficient to allow hands-free delivery or deployment of the utility rack as the cargo frame and any cargo moves, between the storage and access positions. This hands-free delivery is facilitated due to the resistance provided by the assist to the fall of the cargo frame under the influence of gravity. Resistance to movement provided by the assist during movement from the access position to the storage position is not critical, and is preferably no more than a user operating the utility rack can easily overcome manually or that provided by a motor.

Another embodiment of the assist is a double-rod hydraulic cylinder having speed control, wherein a piston is disposed in a hydraulic cylinder and two piston rods are used, one connected to each face of the piston. While a double-rod piston configuration is usable as the assist, it presents several disadvantages when compared with the single-rod embodiment described herein. To provide for substantially greater resistance to movement of the cargo frame from the storage position to the access position as compared to movement from the access position to the storage position, a double-rod piston necessarily must include a fluid circuit external to the cylinder to allow movement of hydraulic fluid from the cylinder portions on respective sides of the piston. Resistance and speed control to movement of the piston and rod is provided by a combination of an adjustable orifice and a check valve as is described herein for the single-rod version of the assist. Use of an external fluid circuit in a double-rod cylinder embodiment since the fluid conduit and connections to the cylinder often leak or are damaged. Protective covering of the external fluid circuit would be possible, but increases the size of the assist fluid movement through holes in the face of the piston, as is commonly done in shock-absorber type cylinders such an arrangement allows movement of the fluid to provide for essentially equal resistance in both directions of movement of the piston.

A double-rod piston assist also increases the length of the device. For hydraulic cylinders of equal stroke length, in the retracted position a double-rod piston assist is approximately twice the length of a single-rod piston assist. In the extended position, a double-rod piston assist is approximately fifty percent longer than a single rod piston assist. Thus the double-rod piston is not nearly as compact as the single rod piston and is consequently not as versatile in fitting into a utility rack design. Compactness of design is often important considering the limited clearance between the utility rack and a vehicle roof. Thus, although providing the speed control characteristics desired by the invention, the particular requirements of an application may make the single rod piston embodiment preferable.

Double-rod pistons providing fluid flow through the face of the piston provide essentially the same resistance to movement in both directions. In the present invention, the size of the holes in the piston may be varied to allow for adjustment of the resistance. The assist of the present invention includes an adjustment for the resistance provided by the assist during movement from the storage position to the cargo position. In the preferred embodiment referring to FIGS. 3a and 4b, turning of adjustment screw 86 increases or decreases the effective diameter of orifice 94, thereby changing the resistance to flow of the hydraulic fluid through the orifice. Decreasing the size of the orifice by means of adjustment screw 86 increases the resistance to fluid flow and thus resistance to extension of the piston rod 76. Increasing the size of the orifice by means of adjustment screw 86 decreases the resistance to fluid flow. This adjustment thereby allows the user to selectively adjust the resistance provided by the assist, depending on the weight of the ladder or other cargo on the cargo frame, and depending on the speed at which the user desires for the cargo frame to be deployed.

The assist of the present invention can be used as original equipment with a utility rack, or can be adapted for use with an existing utility rack. As shown in the embodiments of FIGS. 1, 2, and 3a–3c, the assist 70 is easily adapted to accommodate a variety of utility rack configurations and can therefore be adapted to be retrofitted to existing utility racks.

It will thus be seen that the objects as set forth above, among those made apparent from the preceding description are efficiently obtained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all equivalents thereof.

What is claimed is:

1. A utility rack for a motor vehicle, comprising:
    a stationary mounting frame mountable to a vehicle;
    a moveable cargo frame moveable between an access position and a storage position; and
    a carriage interacting with said cargo frame and actuable to move said cargo frame between said access position and said storage position; and
    an assist capable of assisting movement of said cargo frame between said storage position and said access position; said assist comprising:
        an assist body;
        a hydraulic cylinder disposed within said assist body;
        a piston disposed in said hydraulic cylinder, said piston having a rod side and a blind side; and
        an internal hydraulic fluid circuit disposed in said assist body, said internal hydraulic fluid circuit allowing venting of hydraulic fluid between the rod side and the blind side of said piston, said internal hydraulic circuit comprising a liquid volume compensation reservoir, said liquid volume compensation reservoir providing makeup liquid to the blind side of said piston.

2. A utility rack according to claim 1, wherein said speed control is adjustable to adjust the speed at which said cargo frame moves between said access position and said storage position.

3. The utility rack of claim 1, wherein said resistance to movement of said piston is adjustable.

4. The utility rack of claim 1, wherein said assist provides substantially more resistance to movement or said cargo frame in a direction from said storage position to said access position than for movement of said cargo frame in a direction from said access position to said storage position.

5. The utility rack of claim 3, wherein said resistance to movement is adjustable to compensate for the weight of cargo disposed on said cargo frame.

6. The utility rack of claim 1, wherein said access position is substantially alongside said vehicle, and said storage position is substantially above said vehicle.

7. The utility rack of claim 1, wherein said mounting frame is mountable in a stationary position above and relative to said vehicle.

8. The utility rack of claim 1, wherein said mounting frame comprises at least two substantially parallel frame members.

9. The utility rack of claim 1, wherein said cargo frame comprises at least two substantially parallel cargo members.

10. The utility rack of claim 9, wherein said carriage comprises a rotatable bar capable of inducing movement of said cargo frame between said access position and said storage position.

11. The utility rack of claim 10, wherein said carriage further comprises a first pair of carriage members, each of said first pair of carriage members having first and second ends, each of said first ends affixed to said rotatable bar, one of said second ends attached to one of said cargo members, the other of said second ends attached to another of said cargo members.

12. The utility rack of claim 11, wherein said carriage further comprises a second pair of carriage members, said second pair of carriage members slidably and pivotably connecting said cargo members to said mounting frame.

13. The utility rack of claim 11, wherein said carriage further comprises a second pair of carriage members, said second pair of carriage members each having first and second ends, each of said first ends attached to said mounting frame, one of said second ends attached to one of said cargo members, the other of said second ends attached to another of said cargo members.

14. The utility rack of claim 13, wherein said each of said first pair of carriage members are of substantially the same length; and each of said second pair of carriage member are of substantially the same length; and said first pair of carriage members are of substantially different length than said second pair of carriage members.

15. The utility rack of claim 10, wherein said carriage further comprises a handle attached to said rotatable bar.

16. The utility rack of claim 1, wherein said cargo frame further comprises at least two cargo-securing members.

17. The utility rack of claim 9, wherein each of said cargo members comprises a cargo-securing member.

18. The utility rack of claim 1, wherein said rack is capable of carrying cargo having a substantially elongated dimension.

19. The utility rack of claim 1, wherein said rack is capable of carrying cargo selected from the group consisting of ladders, pipes, lumber, building materials, sports equipment, and tools.

20. The utility rack of claim 1, wherein said assist provides for assisted manual movement of said cargo frame from said storage position to said access position, and allows unassisted movement of said cargo frame from said access position to said storage position.

21. The utility rack of claim 1, wherein said assist provides speed control of movement of said cargo frame from said storage position to said access position sufficient to permit hands-free movement of said cargo frame under the influence of gravity.

22. The utility rack of claim 1, wherein said assist further comprises a speed control adjustable such that said assist provides substantial resistance to movement of said piston in one movement direction of said piston, and substantially unrestricted movement in another movement direction of said piston.

23. The utility rack of claim 1, wherein said speed control comprises an adjustable orifice and a check valve, said check valve diverting flow of hydraulic liquid through said adjustable orifice thereby providing said substantial resistance to movement.

24. The utility rack of claim 1, wherein said piston is a single rod piston.

* * * * *